Aug. 28, 1934.　　　　K. E. PEILER　　　　1,971,352
APPARATUS FOR MAKING GLASSWARE
Filed March 4, 1931　　　3 Sheets-Sheet 1
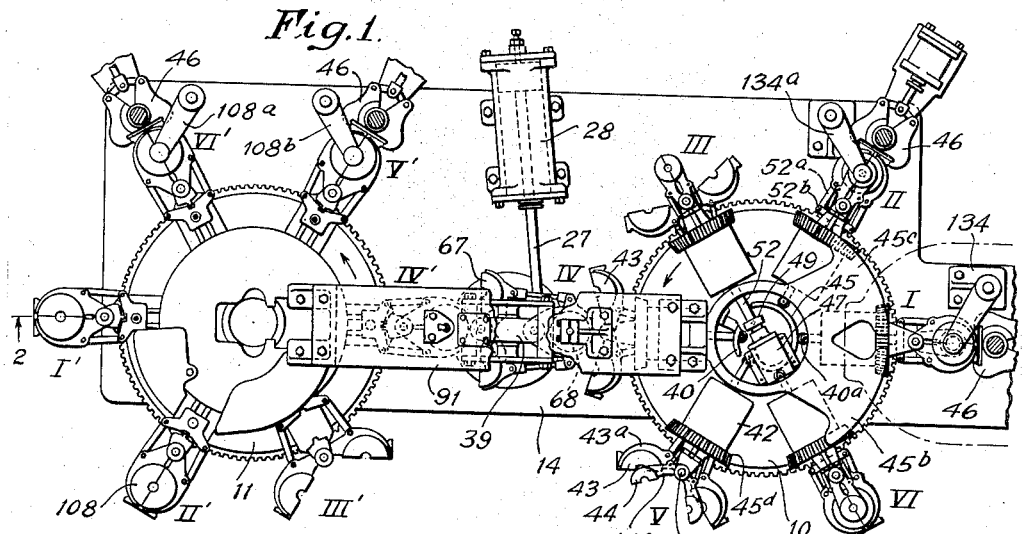
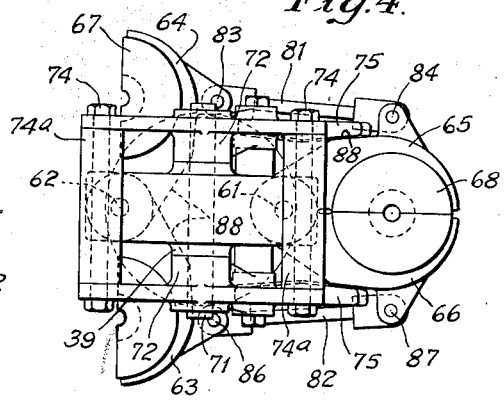
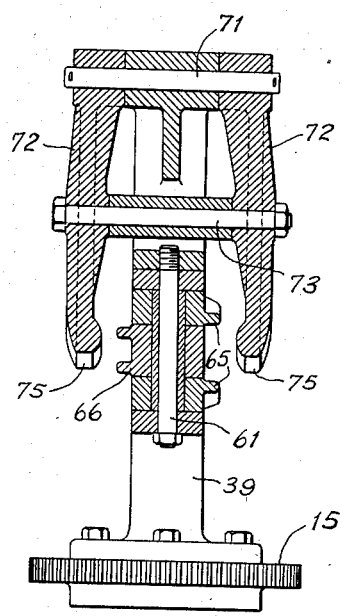
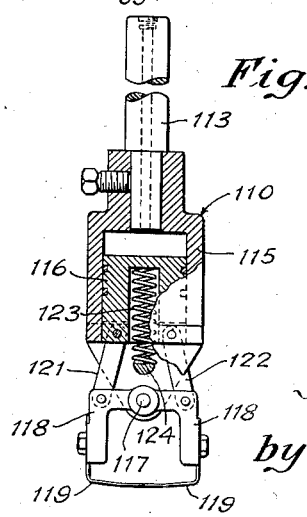
Witness:
A. A. Horn
Inventor
Karl E. Peiler
by Bunn & Parham
Attorneys.

Aug. 28, 1934. K. E. PEILER 1,971,352
APPARATUS FOR MAKING GLASSWARE
Filed March 4, 1931 3 Sheets-Sheet 2

Witness:
A. A. Horn

Inventor
Karl E. Peiler
by Simon & Parham
Attorneys.

Aug. 28, 1934. K. E. PEILER 1,971,352
APPARATUS FOR MAKING GLASSWARE
Filed March 4, 1931  3 Sheets-Sheet 3

Witness:
A. A. Horn

Inventor
Karl E. Peiler
by Brown & Parham
Attorneys.

Patented Aug. 28, 1934

1,971,352

UNITED STATES PATENT OFFICE 1,971,352

APPARATUS FOR MAKING GLASSWARE

Karl E. Peiler, West Hartford, Conn., assignor to Hartford-Empire Company, Hartford, Conn., a corporation of Delaware Application March 4, 1931, Serial No. 519,950

16 Claims. (Cl. 49—9)

The present invention relates to a novel method and apparatus for fabricating glassware, and more particularly relates to a machine and method of forming glassware by the application to each charge of glass of three distinct successively applied body molds and molding operations.

The three-mold process has certain very pronounced advantages over the older and more common two-mold processes, and results, when properly applied, in ware of high quality and particularly in ware in which the distribution throughout the final article is very uniform.

The apparatus and methods of the prior three-mold art have not met with general acceptance in the practical field because they have failed in varying degrees to accomplish the desirable results which the present invention is designed to obtain. Among the reasons for the non-acceptance of the earlier type three-mold machine is the failure to provide therein adequate provision for reheating the blank and/or parison between the several contacts of the glass with the molds. Also the prior methods and apparatus have not been designed to obtain the mold efficiency, and hence the speed of the present apparatus and method.

No generally recognized terminology has been employed in describing a three-mold machine, and I therefore refer, as is sometimes done, to the mold into which a charge of glass is first fed as the "feed mold", the intermediate mold as the "form mold", and the third mold as the "final blow" or "blow mold". I similarly refer to the charge of glass as it leaves the feed mold as the "feed blank" and as it leaves the form mold as the "form blank".

Among the novel and advantageous features provided by the present invention are (1) the combination, in a completely automatic forming machine, of a plurality of feed molds, a plurality of form molds, and a plurality of blow molds, together with suitable glass forming and handling devices so arranged and timed as to assure superior ware made at high machine efficiency; (2) the combination of mold elements and blowing means providing for an adequate and uniform skin formation on the feed blank at the very inception of the operation of forming an article which greatly facilitates later operations in handling and forming the glassware; (3) the provision of a sufficient number of form molds to assure an adequate extraction of heat from the charge by those molds and to thus reduce the period during which the glass must remain in contact with the blow molds; (4) the provision of suitably placed mold opening and glass transferring means the operation of which is properly related to the other operations that adequate reheat is obtained between the feed blank formation and the form blowing, and again between the form blowing and the final blowing; (5) a novel and efficient sequence and timing of successive operations resulting in high quality glassware; and (6) a simple and relatively inexpensive machine comprising the above and other desirable features.

Other specific advantages will appear from the following specification when considered in connection with the accompanying drawings, in which Figure 1 is a somewhat diagrammatic plan view of a machine embodying the present invention;

Fig. 4 is a plan view on an enlarged scale of the "form" molds and their opening and closing mechanism;

Fig. 5 is a sectional view on an enlarged scale taken along the lines 5—5 of Fig. 2; and Fig. 6 is a sectional view on an enlarged scale of the transfer tongs mechanism.

The machine illustrated is of the suspended charge fed type and there are embodied therein many parts and arrangement of parts of the well-known Lynch machine type L. A., which machine is in part shown and described in U. S. Patent 1,787,635 to James W. Lynch and another, to which patent reference is made for a description of such parts as are not herein described in detail. It will be seen that the invention is applicable with certain modifications to forming machines other than that of the Lynch type above referred to, and may be well embodied in a machine of the suction fed type.

General arrangement

The embodiment of my invention diagrammatically illustrated in Fig. 1 comprises a feed mold table, a form mold table, and a final blow mold table, which rotate simultaneously. The molten glass is fed into a feed mold mounted on the feed mold table, is settle blown around a neck pin within a neck ring to form a neck finish thereon, inverted, and blown through the neck finish against a baffle plate to marver it. Subsequently the feed mold is opened and the feed blank is carried suspended in the neck ring to a transfer station where it is enclosed by a form mold, blown to the shape of the form mold and moved to another position where it is enclosed by a final blow mold. Thereafter it is carried by the final blow mold and shaped into a finished article of ware.

In order that my invention may be properly understood, it is necessary that the various parts and their arrangement be described in some detail, and this may be done conveniently in the following groups.

*Tables, table turning and locking mechanism*

Figure 2:
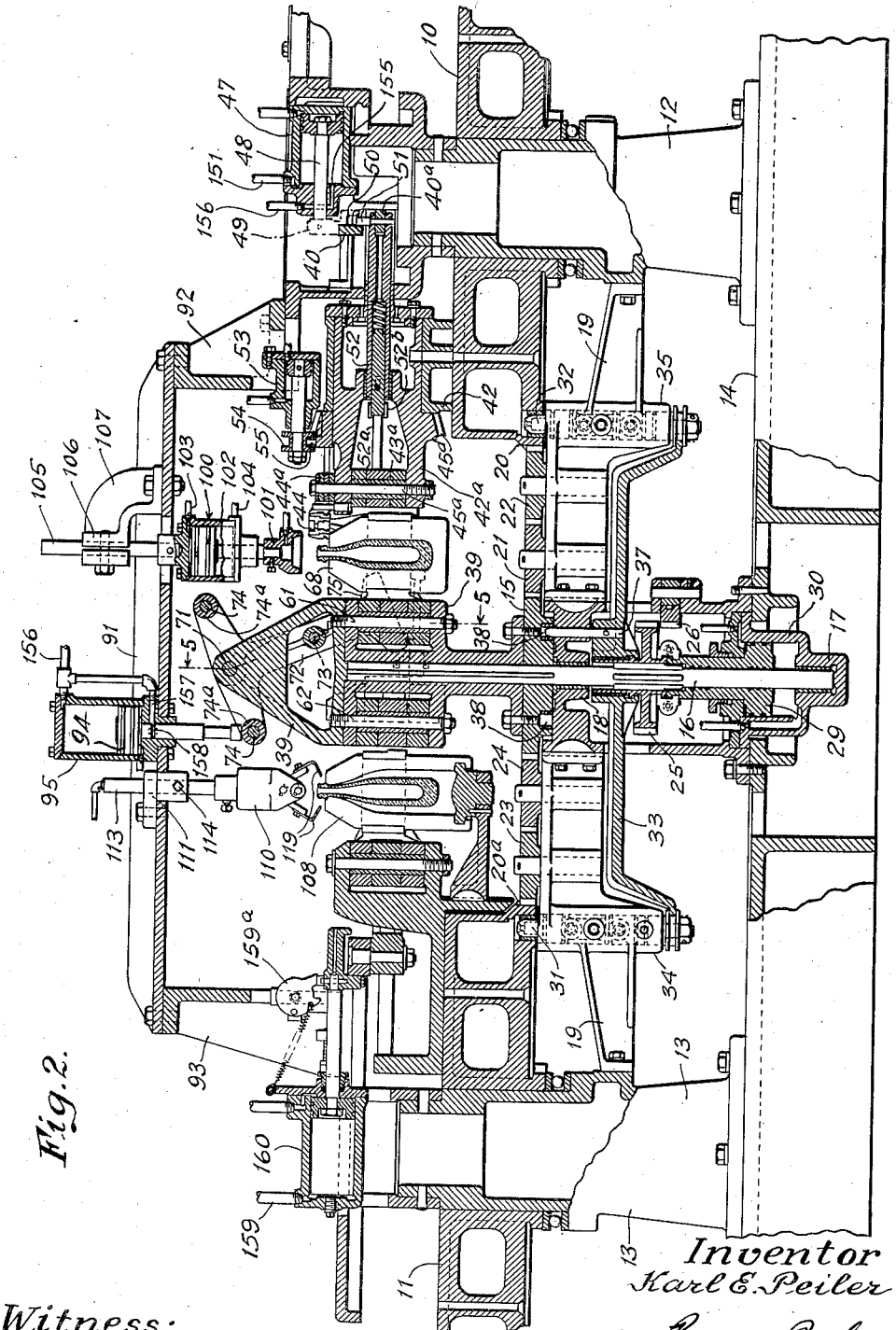
Fig. 2 is a central vertical section on the line 2—2 of Fig. 1, certain parts being omitted for the sake of clarity.

Referring to Figs. 1 and 2, the machine is shown as embodying two tables 10 and 11, referred to hereinafter as the feed mold table and the blow mold table respectively. The tables 10 and 11 are mounted for rotation on pedestals 12 and 13, both of which are mounted on a base 14. The tables are turned intermittently in unison in counter-clockwise directions, as indicated by the arrows in Fig. 1, by a gear 15 mounted on a vertical shaft 16 journaled in bearings 17 and 18. Affixed to the gear 15 is a frame 39 carrying the form molds and other parts associated therewith, hereinafter described in detail. The bearing 17 forms a part of an air cylinder 30, hereinafter described. The bearing 18 is carried by brackets 19 supported by the pedestals 12 and 13. Mounted in bearings on the brackets 19 are gears 21, 22, 23 and 24 connecting the driving gear 15 with gears 20 and 20ª on the lower edges of the feed and blow mold tables 10 and 11 respectively.

The shaft 16 is rotated intermittently by a gear 25 splined thereto which periodically engages a rack 26 on a piston rod 27 of a horizontal cylinder 28 mounted on the base 14. The gear 25 is movable vertically by a hollow piston 29 affixed thereto operating in the cylinder 30, which surrounds the lower end of the shaft 16. Upward movement of the piston 29 raises the gear 25 out of engagement with the rack 26, thus stopping the movement of the tables, and at the same time locks the tables in predetermined relative position by means of the locking pins 31 and 32. The pins 31 and 32 are fixed to a casting 33, which is arranged for movement vertically with the gear 25, but does not partake of the rotation thereof. The pins 31 and 32 are adapted for sliding movement through housings 34 and 35 carried by the brackets 19. The casting 33 carries a third pin 37 which may be projected into a socket 38 in the gear 15 and thus lock that gear and the parts carried thereby (hereafter described), as well as the tables 10 and 11, in a predetermined position relative to the tables. Downward movement of the piston 29 lowers the gear 25 into engagement with the rack 26 and at the same time disengages the locking pins 31, 32 and 37 from their respective sockets.

The ratio between the gears 15, 21, 22, 23 and 24 and the gears 20 and 20ª on the tables is such that for a rotation of the gear 15 through an arc of 180°, the feed mold table and the final blow mold table will each be rotated through an arc of 60°.

*Feed molds, neck rings, and associated mechanisms*

With a feed mold table adapted to halt after each movement through an arc of 60°, I provide six feed mold and neck ring mechanisms positioned 60° apart upon the table. Obviously with other driving arrangements either more or less molds, as found desirable, may be provided. As shown in Fig. 1, the feed mold table is at rest and the feed molds are positioned at six stations I–VI inclusive, 60° apart, station I being the feeding and settle blowing station and station IV being the transfer station.

Referring to Figs. 1 and 2, the feed mold table 10 is provided with six journals or brackets 42 for supporting carriers 42ª for the two-part feed mold holders 43ª and neck ring holders 44ª. Feed molds 43 and neck rings 44 are carried by the holders 43ª and 44ª respectively. Preferably, the combined capacity of the neck ring and feed mold is only slightly, if any, greater than that of the charge of glass fed thereto.

The feed mold holders 43ª and neck ring holders 44ª are hinged to open and close on vertical pins 45ª fixed in the outer ends of the carriers 42ª. The carriers 42ª are turned a half revolution about a horizontal axis twice during each complete rotation of the feed mold table by fixed racks indicated at 45ᵇ and 45ᶜ cooperating with gears 45ᵈ on the carriers 42ª. The rack 45ᶜ is preferably positioned between stations I and II, i. e. between the settle-blowing and counter-blowing stations, and rack 45ᵇ is preferably positioned between stations VI and I. The carriers 42ª are originally so mounted in their journals that a rotation thereof by the rack 45ᵇ will rotate them to a position in which the neck ring is below the inverted feed mold, and hence so that when rotated by rack 45ᶜ the neck ring will be uppermost.

The mold holders of each feed mold are connected by links 52ª to a crosshead 52ᵇ, mounted on one part of a partially telescoping plunger 52. The plungers 52 are mounted to slide in and turn with the feed mold carriers 42ª. These plungers are operated by rollers 40ª and axially aligned pins 51 on their inner ends, which engage the stationary cams 40 and 45 carried by the pedestal 12. As will be seen in Fig. 1, the cam 45 engages the rollers 40ª and closes the feed molds and neck rings between stations IV and VI and holds them closed as they travel in a counter-clockwise direction between stations VI and III. The neck rings are closed and held closed by the blank molds, which are adapted to engage portions thereof. Between station III at which the feed molds are opened and station IV at which the neck ring is opened, the feed molds are held open positively by the coaction of the pins 51 with the cam 40, thus permitting the feed blank to reheat.

The feed molds are opened at station III by an air motor 47. The piston rod 48 of the motor carries a head 49 having a groove 50 therein, into which the pins 51 are guided by the cam 45. Movement of the piston rod radially inwardly of the table after one of the pins 51 moves into the groove 50 causes the corresponding feed mold halves to open.

The neck rings are opened at station IV by an air motor 53 operating, through a spool 54 mounted upon the end of its piston rod, on pins 55 carried by a yoke suitably connected to open and close the neck ring. Both the feed molds and the neck rings are opened at properly timed intervals by the admission and exhaust of air to and from the motors 47 and 53, as hereinafter described.

Except for their locations, the neck pin 165, mold clamps 46, settle blow head 134 and counter-blow head 134ª are identical with similar mechanism described in the Lynch patent above referred to. Referring particularly to Fig. 1, it will be noted that the feeding station I is 180° from the transfer station instead of 120° as in the Lynch patent above referred to, and it is at this station that the neck pin 165, settle blow head 134 and one mold clamp are positioned. At station II, the counterblow head 134ª and another mold clamp are positioned and as previously pointed out the feed mold is reverted to a neck uppermost position between these two stations. At station III, the feed mold is opened and at station IV a form mold closes around a feed blank and the neck ring is opened.

The form mold support, transfer, and operating mechanism

Fixedly mounted on the top of the table driving gear 15 is a frame 39 adapted to support the form molds. Mounted through extensions on the frame 39 at diametrically opposite points are vertical hinge pins 61 and 62, upon which are mounted respectively mold holders 63, 64 and 65, 66, to which are attached form molds 67 and 68. A horizontal hinge pin 71 mounted above the form molds on the frame 39 carries two castings 72 rigidly connected together by a bolt 73 and spacing sleeve in such a manner as to give a spring tension to their lower ends. The upper ends of the castings 72 are connected by bolts 74 passing through bushings or spacing sleeves 74ª and the lower ends thereof form a clamp 75, so that when the castings 72 as a unit are tilted about the pivot 71, the clamp will be forced into contact with one pair of mold holders to close them and maintain them in closed position.

The mold holders 64, 65 and 63, 66 are joined by link members 81 and 82 respectively. The link member 81 is pivoted at 83 to mold holder 64 and at 84 to mold holder 65, and similarly the link 82 is pivoted at 86 to mold holder 63 and at 87 to mold holder 66. The links 81 and 82 are of such a size that when one mold is closed by the action of the clamps 75, the other mold is opened; and conversely when the second mold is closed, the first mold is opened. The mold holders are each formed with a flat surface 88 against which the clamp 75 is forced to close the mold and which cooperates with the spring tension under which the clamp is held to maintain the molds in closed position until they are opened positively.

A beam 91 is supported by brackets 92 and 93 above the frame 39. Mounted on the beam 91 over the bolts 74 and so located that the head of a piston 94 mounted therein will press against one of the bushings 74ª is an air cylinder 95, to either end of which air is alternately admitted to extend and retract the piston 94. The admission of air, as hereinafter pointed out, is timed with the rotation of the frame so that the piston will be extended after the various mold tables have come to rest. By extending the piston, the form mold is closed about the feed blank as it is held by the neck ring and simultaneously the other form mold opens so that the blow mold can close about the formed parison.

A bracket 107, also mounted upon the beam 91, carries a blowhead mechanism 100 which is axially centered above a form mold when the form mold is at rest at station IV. The blow head mechanism comprises a blow head 101 of conventional type, and an air motor 102 into either end of which air is alternately admitted and exhausted through pipes 103 and 104 to raise and lower the blow head. The cylinder 102 is fixed to a rod 105 for vertical adjustment in a split bearing 106 in the bracket 107.

Axially centered over a blow mold and form mold in their common positions of rest is a tongs mechanism 110. The tongs mechanism 110 is held by a bracket 111 mounted on the beam 91. Extending through the bracket 111 is a pipe 113 which is adjustable vertically in the bracket 111 and is secured in adjusted position by a set screw 114. To the lower end of the pipe 113 is connected (Fig. 6) a tongs actuating device, which comprises a cylinder 115 in which is a piston 116. To the lower end of the cylinder 115 are horizontally pivoted at 117 two elbow levers 118, to the lower end of each of which ware gripping fingers 119 are attached. The elbow levers 118 are pivotally connected at their upper ends by links 121 and 122 to the lower end of the piston 116. The piston 116 is hollow and within the piston is a spring 123 mounted against an abutment 124 from an extension of the lower end of the cylinder 115, and thus the piston is urged upwardly by the spring and the tongs normally maintained in an open position. Upon the admission of air pressure through the pipe 113, the spring 123 is compressed by the extension of the piston 116, and the tongs 119 closed about a form blank.

Final blow molds and associated mechanism

As indicated in Fig. 1, the final blow mold table 11 carries six final blow molds 108 spaced 60° apart. As previously pointed out, the blow mold table is adapted to stop six times in the course of a complete rotation thereof, as indicated in Fig. 1 at station I' to VI' inclusive, station IV' being the transfer station. A finish blow head 108ª is positioned at station VI', 120° from the transfer station, as well as the mold clamping device 46, as in the customary Lynch practice.

I also position a second blow head 108ᵇ with an associated mold clamping device at the station V', 60° from the transfer station. If found desirable, the blow head at station VI' may be eliminated and the blow head at station V' used alone. Otherwise the final blow table with all its associated mechanisms and parts carried thereby may be identical with that disclosed in the aforesaid Lynch patent, and reference is made thereto for a further description.

Operation

The process involved in the formation of an article of ware from a charge of glass begins with the presentation of a charge of molten glass to a feed mold at station I. At this station the closed feed mold is in an inverted position with its associated neck ring closed therebelow. A charge of glass is here supplied to the mold, settle blown into the neck ring around an upraised neck pin, and thereby a neck finish is formed thereon. The table is then rotated and the feed blank is brought to station II, and while moving from station I to station II is reverted so that it is in neck-up position. A baffle plate is applied to the bottom of the mold and the glass is counterblown through the neck to form a small bubble therein and to marver the bottom of the feed blank. While the first feed blank is being counterblown, a second charge of glass is being fed into a succeeding mold and being settle blown. The table is then rotated to bring the first blank to station III, the second blank to station II, and an empty mold to station I. At station III, the feed mold is opened, but the neck ring is maintained in closed position about the feed blank. The second feed blank is counterblown at station II, and a neck finish is formed on a third charge of glass at station I. The table is again rotated to bring the first blank to station IV, the second blank to station III, and an empty mold to station I.

At station IV, a form mold closes about the feed blank; a blow head descends and blows the feed blank to the size of the form mold to form a form blank; and the neck ring opens. Substantially simultaneously with the closing of the form mold about the feed blank at station IV, the feed mold surrounding the second feed blank is opened at station III; and simultaneously with the form blowing of the first feed blank, the fourth charge of glass is being settle blown to form a neck finish at station I and the third feed blank is being counterblown at station II.

Upon a further rotation of the table, the form mold inclosing the first charge of glass, now blown to a form blank, is rotated through 180° to station IV'; the second charge of glass is brought to station IV; the third charge of glass is brought to station III; the fourth charge of glass is brought to station II; and an empty mold is presented at station I where the fifth charge of glass is supplied and settle blown. Upon the locking of the tables, the first charge of glass, now a form blank, is grasped by the tongs of the transfer mechanism 110, the form mold encircling the blank opens and a blow mold closes thereabout. Thereafter the tongs which have held the form parison while the form mold is opening and the blow mold is closing, release their grip. Simultaneously with the opening of the form mold about the first parison, the other form mold closes about the second feed blank.

Thereafter upon further rotations of the table, following charges of glass are successively fed at station I and are carried through the same relationships to other operations as have been described in connection with the first four charges of glass. After the blanks are transferred to the final blow mold, final blowing pressure is applied thereto, preferably at stations V' and VI', and the ware thereafter removed from the mold.

It is desirable that the feed mold closely approximate the shape of the charge fed thereto, so that when the charge is being counterblown there will be but a slight expansion of the charge of glass in the feed mold. It is likewise desirable that the form mold be intermediate in size between the size of the feed mold and that of the final blow mold, and its shape be approximately that of the article to be formed.

It will be noted that in accordance with the method outlined above, the feed blank is exposed to the atmosphere for almost the entire duration of the period of dwell between movements of the machine and for the time which it takes the machine to move from one station to another and for the form mold to close. This time is sufficient to allow the outer surface of the glass in the feed blank which has been chilled by contact with the feed mold to reheat from within. Thus when the feed blank is blown in the form mold, there will be no cold or hot spots which cause unequal distribution of glass in the finished article.

*Air lines and timing mechanism*

The operation of the various mechanisms as above described may be carried out by suitable connections to the air lines of the mechanism disclosed in the aforesaid Lynch patent, or by connection to such an air line as has been modified in modern practice. In view of the new association of parts and the necessity for properly timing them, I will describe the various air lines and their control in detail as follows:

Upon delivery of a charge of glass to the feed mold, the timing device of the feeder (not shown in detail, but diagrammatically) admits air to the pipe 125 and thereby shifts a control valve 126 to admit air from the main M to a branched pipe 127. One branch 130 of the pipe 127 leads to the main power cylinder valve 128 to shift it to the right from the position shown in Fig. 3. This air must pass through a port 129 in the housing 35 of the locking pin 32 associated with the feed mold table, which port registers with a groove 131 around the pin when the pin is in locking position. A stop cock 132 is provided to shut off the flow of air through the pipe 125 if it is desired to prevent the actuation of the machine. A branch 103 of the pipe 130 leads to the upper end of the form blowhead cylinder 95 to lower the blow head into operative position.

Another branch 133 of the pipe 127 leads to one end of a settle blowhead oscillating cylinder 134 to swing the blowhead over the feed mold when it is at station I, and a portion of the air going to that cylinder goes through a by-pass 135 and a pipe 136 to one end of a settle blow-head cylinder 137 to lower the settle blow-head into operative contact with the feed mold. The reversal of the main control valve 126 opens the air line 127 with its branches to the atmosphere and permits them to exhaust. At the same time, it admits air to the pipe 140 which leads to the outer end of the settle blow-head oscillating cylinder 134, the lower end of the settle blow-head cylinder 137, and through a branch 104 to the lower end of the form blowhead cylinder 102. Thus the settle blow-head is raised and swung to one side and the form blowhead cylinder raised to the position shown in Fig. 2. In order to control the speed of operation of the settle blow-head oscillating cylinder 134, a needle valve 141 may be inserted in the pipe line 140 leading thereto.

Figure 3:
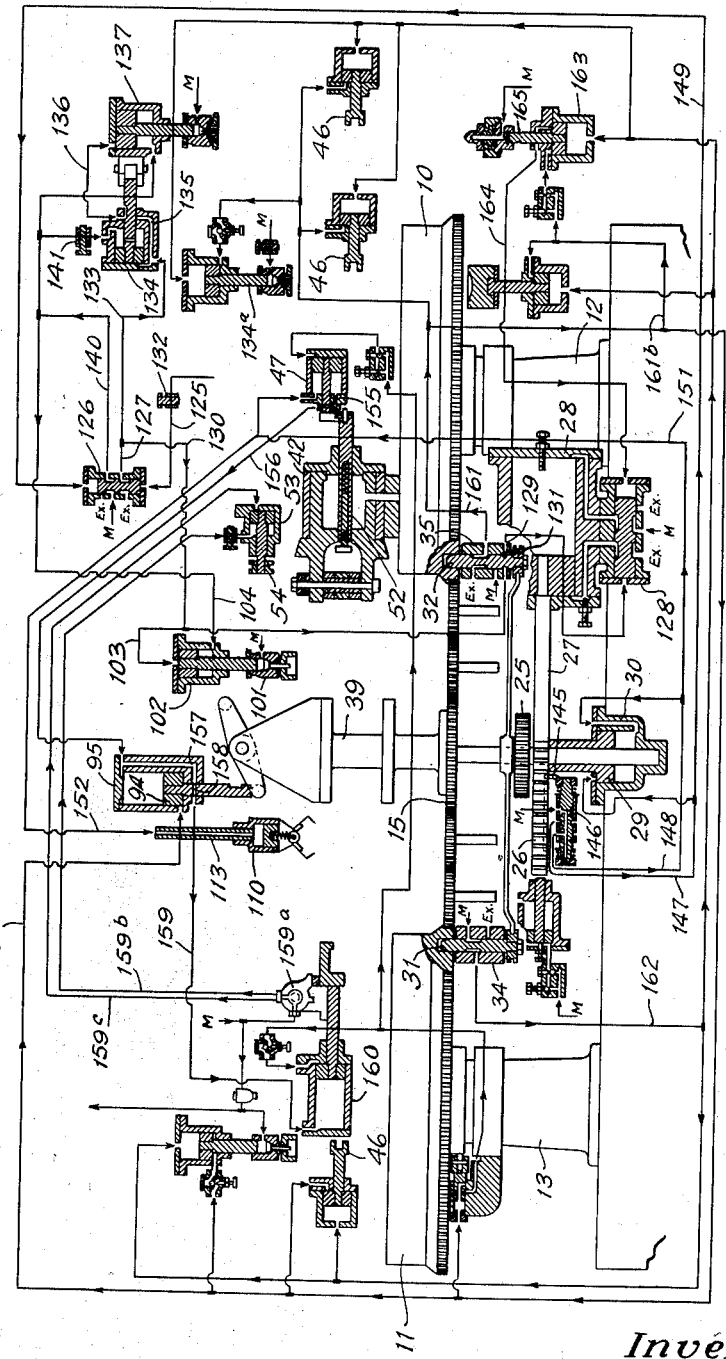
Fig. 3 is a diagram of air connections operating various instrumentalities of the machine of Figs. 1 and 2.

Movement of the main power cylinder valve 128 to the right as shown in Fig. 3 admits air from the pressure main M to the left-hand end of the table-rotating cylinder 28 and moves the piston-rod 27 and rack thereon in its idle stroke to a position for engagement with the gear 25 for rotating the table. As the rack approaches the end of this idle or return movement, it moves the finger 145 on the table-control valve 146 to shift the latter to the right. The gear shifting piston 29 is moved by air admitted to the cylinder 30 from the table-control valve 146 through the air lines 147 and 148, movement of the control valve by the return of the piston in the table-rotating cylinder 28 at the end of its return stroke causing the admission of air from the pressure main M to the line 147 and simultaneously opening the line 148 to the atmosphere for lowering the gear into mesh and unlocking the tables preparatory to their rotation.

A branch 149 of the line 147 leads to one end of the main control valve 126 for resetting it ready for the next actuation thereof by the feeder mechanism.

A branch 151 of the line 148 leads to the outer end of the blank mold opening cylinder 47, and a second branch 152 leads to the upper end of the transfer tongs opening cylinder 110.

Air passes from the line 151 through a by-pass 155 in the feed mold opening cylinder 47 and line 156 to the upper end of the form mold opening and closing cylinder 95, to lower the piston therein, to close a form mold about the feed blank at station IV, and to open the opposite form mold at station IV'. Air from the line 156 also passes through a by-pass 157 around the cylinder 95 and through a slot 158 in the piston rod of that cylinder. The slot 158 registers with the by-pass 157 when the piston of the cylinder 95 is in its lowermost position; that is, with the form mold open at station IV' the air passes through a pipe line 159 to the rear end of the blow mold closing cylinder 160 to move forwardly the piston thereof and thus close the blow mold about the blank. Thus I insure that the blow mold will not close until after the form mold has opened.

Movement of the blow mold opening and closing mechanism causes a movement in an oscillating valve 159$^a$, so that when the blow mold is closed, air is admitted from the supply M through the valve to the line 159$^b$, leading to the neck ring opening device 53, opening the neck ring. When the blow mold opening device moves in the opposite direction, air is admitted to the pipe line 159$^c$; the line 159$^b$ is connected to the atmosphere, so that it may be exhausted; and air flowing through the line 159$^c$ is admitted to the rear end of the neck ring opening device to reposition the spool 54 thereon to receive the pin on a following neck ring.

The operation of the cylinder 30 to lower the piston 29 and the splined gear 25 to engage the rack 26 and at the same time to withdraw the locking pins 31 and 32 from the tables effects the admission of air from the pressure main M through the housing 35 surrounding the pin 32 to the air line 161 for releasing the mold clamps 46 and blow heads, and simultaneously opens the air line 162 to the atmosphere through the housing 34 surrounding the pin 31. The pipe 161 has different branches leading to the cylinders that actuate the various forming tools and blow heads, except the settle blow-head and parts operating in conjunction with the form blow molds, previously referred to.

Air passes through the branch 161$^b$ of the line 161 to the neck pin actuating cylinder 163 to withdraw the neck pin from the form mold. When the neck pin is in withdrawn position, air passes from the line 161$^b$ through a slot 165 in the piston rod of the neck pin actuating cylinder 163, and through a pipe 164 to the right-hand end of the main power cylinder valve 128 to throw the valve to the left and thereby admit air from the pressure main M to the right-hand end of the table rotating cylinder 28. Thereupon the piston and the piston rod 27 will be moved to the left to actuate through the rack 26 the gear 25 and gears 15, 21, 22, 23 and 24 to rotate the tables through an angle of 60° and shift each feed mold and blow mold from one operating station to another and to rotate the form molds through an angle of 180°.

Upon completion of the table-turning movement, the table control valve 146 will be moved to the left as shown in Fig. 3 to admit air from the pressure main M to the pipe 148 and to open the pipe 147 to the atmosphere. This will raise the piston 29, withdraw the splined gear 25 from the rack 26, and lift the locking pins 31, 32 and 38 to lock the tables and frame. Part of the air admitted to the pipe 148 passes through the branch 151 and actuates the feed mold opening mechanism.

Shifting the locking pins to lock the tables opens the pipe 161 to the atmosphere through the valve 32, and also admits air from the pressure main through the valve 31 to the pipe 162, thereby actuating the mold clamps and blow heads to engage the molds and perform the several forming and blowing operations. When the tables are unlocked at the close of the blowing operation, the reversal of pressure in the pipes 161 and 162 will lift the blow heads and shut off further supply of blowing air thereto.

It will be obvious to those familiar with the Lynch type of forming machine that the change made in order to properly time the machine described above may be readily accomplished without disturbing the normal air lines of the Lynch machine.

It is to be understood that the hereinbefore described embodiment of the invention is for the purpose of illustration only and various changes may be made therein without departing from the spirit and scope of the invention as defined in the appended claims.

I claim:

1. Apparatus for forming hollow glassware, comprising a plurality of feed molds movable in a single orbital path, means for moving said feed molds in said path, means associated with said feed molds for successively forming charges of glass delivered successively to said feed molds into feed blanks each having a finished neck portion and at least a forming cavity therein, a plurality of form molds in number different from the number of said feed molds, means engaging said finished neck portions for successively and positively transferring the feed blanks formed in said feed molds to said form molds, means for successively expanding the feed blanks to form parisons in said form molds, a plurality of blow molds movable in a single orbital path spaced from the path of said feed mold, means for moving the blow molds in their path, means to transfer parisons successively from said form molds to said blow molds, and means for successively expanding the parisons to final form in said blow molds.

2. Apparatus for forming hollow glassware, comprising feed molds, means for forming feed blanks therein, a plurality of form molds, means for transferring feed blanks to said form molds successively, means for expanding said feed blanks to parison form in said form molds, blow molds, means for transferring parisons to said blow molds, means for expanding the parisons to final form in said blow molds, and a common means for simultaneously closing one form mold about a feed blank and opening another form mold to expose the body portion of a parison formed therein to the atmosphere.

3. Apparatus for forming hollow glassware, comprising feed molds, means to form feed blanks therein, a plurality of form molds, means for transferring feed blanks successively to said form molds, means for expanding said feed blanks to parison form in said form molds, blow molds, means for moving said form molds successively from a receiving position in juxtaposition to said feed molds to a delivery position in juxtaposition to said blows molds, a common means for substantially simultaneously closing one of said form molds at said receiving position and for opening another of said form molds at said delivery position, means for transferring parisons to said blow molds at said delivery position, and means to expand the parisons to final form in said blow molds.

4. The method of forming hollow glassware which comprises supplying a charge of glass to a mold, settle blowing said charge to form a neck finish thereon at one station, transferring said blank to a second station, counterblowing said blank at said second station to marver the bottom thereof and thereby form a feed blank, transferring said feed blank to a third station, opening said mold at said third station, transferring said feed blank free of said mold to a fourth station, enclosing said blank in a form mold at said fourth station, blowing said blank in said form mold at said fourth station to form a parison, transferring said parison to a final blow mold, and blowing said parison to final form therein.

5. The method of forming hollow glassware which comprises supplying a charge of glass to a mold and associated neck ring, settle blowing said charge, transferring said charge to a counterblowing station, counterblowing said charge and simultaneously supplying a second charge of glass to a succeeding mold and neck ring and settle blowing said second charge, transferring said first charge to a third station and said second charge to said counterblow station, substantially simultaneously freeing said first charge from the first named mold, counterblowing said second charge in the second named mold and supplying a third charge to a succeeding mold and associated neck ring and settle blowing said third charge, simultaneously transferring said first charge to a fourth station, the second charge to said third station, and the third charge to said counterblow station, substantially simultaneously enclosing said first charge in a form mold and form blowing said charge, freeing said second charge from the mold in which it has been enclosed, counterblowing said third charge and supplying a fourth charge to a succeeding mold and associated neck ring and settle blowing said charge, and thereafter transferring said charges successively to final blow molds and blowing them to final form therein.

6. In the use of an intermittent rotary glassware forming machine adapted to stop at a plurality of stations and having a feed mold and associated neck ring, a form mold and a final blow mold, the method which comprises supplying a charge of glass to said feed mold and associated neck ring, settle blowing said charge to form a neck finish thereon, transferring said charge to a second station, counterblowing said charge, transferring said charge to a third station, freeing said charge from contact with said feed mold at said station, transferring said charge to a fourth station, enclosing said charge in a form mold and form blowing said charge at said station, transferring said charge in said form mold to a succeeding station, freeing said charge from said form mold and enclosing it in a final blow mold, and thereafter blowing said charge to final form.

7. In combination in a rotary glass forming machine, a feed mold carrier, means for rotating said carrier intermittently, a feed mold on said carrier, means to supply a charge of glass to said mold, means to settle blow said charge of glass in said mold to form a neck finish thereon, means to counterblow said charge in said mold to marver the bottom thereof, means to open said feed mold, a form mold, means for supporting said form mold and for moving it intermittently between at least two spaced positions, means to transfer said counterblown charge to said form mold, means for thereafter releasing the glass in said form mold from said transfer means, means to form blow said charge into a parison in said form mold, a final blow mold carrier, means for rotating said blow mold carrier intermittently, a final blow mold on said blow mold carrier, means including said form mold to transfer said parison to said final blow mold, and means independent of any of the aforesaid means for final blowing said parison in said final blow mold.

8. In combination in a rotary glass forming machine, a plurality of feed molds, means to supply charges of glass successively to said molds, means to settle blow said charges in said molds to form neck finishes thereon, means to counterblow said charges in said molds to marver the bottoms thereof, means to open said feed molds, a form mold operable in the successive form blowing of charges of glass shaped in a plurality of said feed molds, means to transfer said charges to said form mold, means to form blow one of said charges while a succeeding charge of glass is being fed and settle blown in a succeeding feed mold, a final blow mold, means to transfer said first-mentioned charge to said final blow mold, and means for final blowing said charge.

9. The method of making hollow blown glassware in a glass forming machine adapted to present a charge of glass to successive stations for the performance of various operations on the charge, which comprises supplying a charge of glass to a feed mold, settle blowing said charge of glass at one station, transferring said charge of glass to another station, counterblowing said charge in said feed mold to form a feed blank, exposing said feed blank to the atmosphere for a time as great as the time of settle blowing of said blank and for the time of transfer thereof to the station at which it is counterblown, form blowing said blank, and thereafter blowing said form blown blank to final form.

10. Apparatus for forming hollow glassware comprising a feed mold, a form mold, and a blow mold, each mounted for rotation about a different axis, means for rotating said molds intermittently about their respective axes, a neck ring adapted to cooperate alternately with the feed and form mold, the internal cavities of the feed mold and neck ring combined being substantially equal to the space occupied by a solid charge of molten glass necessary to form the article to be made, means for feeding charges to the neck mold and feed mold, means to compact the charge into the neck ring to form the finish, a bottom plate adapted to coact with the feed mold, means for thereafter forcing a charge into contact with the bottom plate, means acting after such compression to remove the bottom plate and feed mold leaving the blank form therein attached to the neck mold, whereby the body of the blank may reheat for a predetermined time, means for closing the form mold around the blank, means for blowing the blank to a parison by forcing it into contact with the form mold, means for transferring said parison to said blow mold and suspending it from its upper portions within said blow mold but out of contact with the walls thereof for a predetermined time to permit reheating of the parison in the blow mold, means for thereafter expanding the parison to final form in the blow mold to form the desired article.

11. Apparatus for forming hollow glassware, comprising a feed mold carrier rotatable about a vertical axis, a feed mold thereon movable in a circular path about said axis, means to form feed blanks each having a finished neck portion and at least a blowing cavity therein in said feed mold, a form mold carrier rotatable about a vertical axis, a form mold thereon rotatable in a circular path about the axis of said form mold carrier, the path of said form mold being at one point tangent with the path of said feed mold, means engaging such finished neck portions for positively and accurately transferring a feed blank formed in said feed mold to said form mold substantially at the point of tangency of the paths of these molds, means to expand a feed blank formed in said feed mold to form a parison in said form mold, a blow mold carrier rotatable about a vertical axis, a blow mold thereon rotatable in a circular path about the vertical axis of said blow mold carrier, the path of said blow mold being tangent at one point to the path of said form mold, means to transfer a parison from said form mold to said blow mold substantially at the point of tangency of the paths of these molds, and means to blow the parison formed in said form mold to final form in said blow mold.

12. Apparatus for forming hollow glassware, comprising a feed mold carrier rotatable about a vertical axis, a form mold carrier rotatable about a vertical axis eccentric of the first named axis, a blow mold carrier rotatable about a vertical axis eccentric of the two other named axes, means to rotate all of said carriers intermittently, a feed mold and a neck mold on said feed mold carrier and rotatable thereby in a circular path, a form mold on said form mold carrier and rotatable thereby in a circular path tangent to the circular path of said feed mold and neck ring, the point of tangency comprising one of the dwell stations for the molds of said feed mold and form mold carriers, means to form a feed blank in said feed mold and neck ring, means to open said feed mold to leave said feed blank depending from said neck ring while at the tangent dwell station, means to transfer a feed blank so formed to said form mold by said neck ring at said tangent dwell station, means for expanding the feed blank within the form mold to form a parison, a blow mold on said blow mold carrier and rotatable thereby in a circular path, means for transferring the parison from said form mold to said blow mold during a dwell in the movement of said form mold and blow mold carriers and subsequent to the dwell during which said feed blank was transferred from said feed mold to said form mold, and means for blowing said parison to final form in said blow mold, whereby said form mold operates to move the partially formed glass article from a position adjacent to said feed mold carrier to a position adjacent to said blow mold carrier.

13. Apparatus for forming hollow glassware, comprising a feed mold carrier rotatable about a vertical axis, a form mold carrier rotatable about a vertical axis eccentric of the first named axis, a blow mold carrier rotatable about a vertical axis eccentric of the other two named axes, means for rotating all of said carriers intermittently, a feed mold on said feed mold carrier and movable thereby in a circular path, means for forming a feed blank in said feed mold, a form mold on said form mold carrier and movable thereby in a circular path, means for automatically and positively transferring a feed blank formed in said feed mold to said form mold, means for expanding the feed blank so transferred to form a parison in said form mold, a blow mold on said blow mold carrier and rotatable thereby in a circular path tangent to the path of said form mold at a common dwell station for said form and blow molds, tongs positioned to grip the neck of a parison at the tangent point of the paths of said form mold and said blow mold, means for transferring a parison from said form mold to said blow mold including means for opening said form mold at said tangent point, means for closing and opening said tongs, and means for closing the blow mold at said tangent point, and means for blowing the parison to final form in said blow mold.

14. Apparatus for forming hollow glassware, comprising a feed mold carrier rotatable about a vertical axis, a form mold carrier rotatable about a vertical axis, a blow mold carrier rotatable about a vertical axis, the axis of each of said carriers being eccentric of the other two-named axes, means for rotating all of said carriers intermittently, a feed mold and neck ring on said feed mold carrier and movable thereby in a circular path, a form mold on said form mold carrier and movable thereby in a circular path, a blow mold on said blow mold carrier and movable thereby in a circular path, the path of said form mold being tangent at one common dwell station of this mold and said feed mold and neck ring with the path of said feed mold and neck ring and being tangent at another common dwell station of said form mold and said blow mold with the path of said blow mold, means for forming a feed blank in said feed mold and neck ring, means for opening said feed mold to leave the feed blank depending from said neck ring when it is at the common tangent dwell station with said form mold, means including said neck ring to transfer the feed blank from said feed mold to said form mold at the common tangent dwell station of said feed mold and form mold, means to expand the feed blank to form a parison in said form mold, tongs positioned to close about the neck of the parison at the common tangent dwell station of said form mold and said blow mold, means for transferring the parison from said form mold to said blow mold including means for opening said form mold at the common dwell station with said blow mold, means for closing and opening said tongs, and means for closing said blow mold at its common dwell station with said form mold, and means for expanding the parison to final form in said blow mold.

15. Apparatus for forming hollow glassware, comprising a plurality of feed molds, means for forming feed blanks therein, a plurality of form molds, means for transferring the feed blanks from said feed molds successively to said form molds, means for expanding said feed blanks to parison form in said form molds, a plurality of blow molds, means for moving said form molds successively from a receiving station at which they receive the feed blanks made in said feed molds to a delivery station at which the formed parisons are transferred therefrom to said blow molds, a common means for closing a form mold about a feed blank at said receiving station and opening another form mold to free a parison formed therein at said delivery station, means for transferring parisons successively from said form molds to said blow molds, and means to expand the parisons to final form in said blow molds.

16. Apparatus for forming hollow glassware, comprising a feed mold carrier, a plurality of feed molds and neck rings disposed about the periphery of said carrier and movable thereby in a circular path, independent means for opening and closing said feed molds and neck rings, means for forming feed blanks in said feed molds and neck rings including means for settle blowing the glass charge and means for thereafter counterblowing the glass charge, a form mold carrier mounted for rotation about a vertical axis eccentric of the axis of the feed mold carrier, a pair of form molds thereon mounted for rotation in a circular path tangent to the path of movement of the feed molds, means for rotating said carriers intermittently to cause said feed molds and neck rings and said form molds to have a common dwell station at the point of tangency of their paths, means including said neck rings for transferring said feed blanks to said form molds successively at the common tangent dwell station, means for expanding the feed blanks to parison form in said form molds, a blow mold carrier mounted for rotation about a vertical axis eccentric of the axes of both said feed mold and said form mold carriers, a plurality of blow molds on said blow mold carrier movable in a path having a point of tangency with the path of said form molds at a common dwell station of said blow molds and said form molds, means for rotating said blow mold carrier intermittently in timed relation to the rotation of said feed mold and form mold carriers, means including tongs adapted to grip the neck of a parison at the common dwell station of said form molds and blow molds for transferring parisons from said form molds to said blow molds, means for opening and closing said tongs, means for opening and closing said blow molds, and means for blowing said parisons to final form in said blow molds.

KARL E. PEILER.